(12) United States Patent
Amidon et al.

(10) Patent No.: US 7,818,336 B1
(45) Date of Patent: Oct. 19, 2010

(54) METHODS, SYSTEMS, AND PRODUCTS FOR SEARCHING SOCIAL NETWORKS

(75) Inventors: Christopher M. Amidon, Apex, NC (US); Richard J. Walsh, Raleigh, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 440 days.

(21) Appl. No.: 11/512,540

(22) Filed: Aug. 30, 2006

(51) Int. Cl.
*G06F 17/30* (2006.01)
(52) U.S. Cl. ..................................... 707/769
(58) Field of Classification Search ................ 707/609, 707/705, 769, 802
See application file for complete search history.

(56) References Cited

U.S. PATENT DOCUMENTS

| | | | |
|---|---|---|---|
| 7,369,036 B1 * | 5/2008 | Vacherand et al. ......... 340/10.1 |
| 2003/0236772 A1 * | 12/2003 | Makris et al. .................. 707/3 |
| 2004/0019657 A1 * | 1/2004 | Akiyama .................... 709/217 |
| 2004/0034638 A1 * | 2/2004 | Brown et al. .................. 707/10 |
| 2004/0148275 A1 | 7/2004 | Achlioptas |
| 2004/0162830 A1 * | 8/2004 | Shirwadkar et al. ........... 707/10 |
| 2005/0086205 A1 * | 4/2005 | Franciosa et al. .............. 707/3 |
| 2005/0091202 A1 | 4/2005 | Thomas |
| 2005/0131894 A1 | 6/2005 | Vuong |
| 2005/0159970 A1 | 7/2005 | Buyukkokten et al. |
| 2005/0216533 A1 | 9/2005 | Berkhin |
| 2005/0283497 A1 | 12/2005 | Nurminen et al. |
| 2006/0004789 A1 | 1/2006 | Lunt et al. |
| 2006/0004892 A1 | 1/2006 | Lunt et al. |

FOREIGN PATENT DOCUMENTS

WO WO2005/020620 A2 * 3/2005
WO WO2005/096663 A1 * 10/2005

* cited by examiner

*Primary Examiner*—Fred I Ehichioya
(74) *Attorney, Agent, or Firm*—Withrow & Terranova, PLLC

(57) ABSTRACT

Methods, systems, and products are disclosed for searching social networks. A device is encountered that sends a query. The query comprises a search packet. A content search is performed according to a query parameter described by the search packet. The content search is then repeatedly performed according to a duration parameter described by the search packet.

21 Claims, 9 Drawing Sheets

METHODS, SYSTEMS, AND PRODUCTS FOR SEARCHING SOCIAL NETWORKS

BACKGROUND

This application generally relates to data processing and, more particularly, to processing queries for content searches.

Social networks may be exploited for content retrieval. A social network is a person's family, friends, and even "friends of friends." Whenever we encounter a member of our social network (whether a friend or even a "friend of a friend"), we have a natural tendency tend to put more trust in that interaction. Whatever is discussed or exchanged, we have higher trust in those social interactions than with persons unknown to us. This natural tendency to trust members of our social network can be exploited when performing content searches. When we query for movies, music, or any other content, we may prefer to receive content from members of our social network, rather than receiving content from a complete stranger. What is needed, then, are methods, systems, and products that search our social network for movies, pictures, and other contents.

SUMMARY

The problems noted above, along with other problems, may be reduced or eliminated by methods, systems, and products that search our social network(s) for content. When we search for desired content, this invention exploits our natural tendency to prefer social acquaintances. As our communications devices encounter each other, this invention determines whether an encountered device is a member of our social network. If the encountered device is associated with a friend, or perhaps even a "friend of a friend," the present invention may communicate a search packet. The search packet describes what content is desired, if the query may be propagated to other devices, and how any search results should be reported. The search packet, in other words, may completely describe the desired content search. While the search packet may be communicated during any length of an encounter, the search packet is ideally suited for momentary or transient encounters, where devices have a brief, short-term encounter. The search packet thus provides at least a minimum of information to accomplish the desired content search. The search packet may then endure to search a user's social network, even though the encounter may be brief and transitory.

According to aspects of the present invention, a method is disclosed for searching a social network. A device is encountered that sends a query. The query comprises a search packet. A content search is performed according to a query parameter described by the search packet. The content search is then repeatedly performed according to a duration parameter described by the search packet.

According to another aspect of the present invention, a system is disclosed for searching a social network. The system has an agent application stored in memory, and a processor communicates with the memory and executes the agent application. The system receives a query comprising a search packet. The system searches for content according to a query parameter described by the search packet. The system then repeatedly performs the search according to a duration parameter described by the search packet.

In yet another aspect, a computer program product searches social networks. The computer program product comprises computer-readable media storing processor-executable instructions. The instructions cause a processor to receive a query comprising a search packet. The processor queries or searches for content according to a query parameter described by the search packet. The processor repeatedly performs the search according to a duration parameter described by the search packet.

Other aspects, including systems, methods, and/or computer program products according to the present invention will be or become apparent to one with ordinary skill in the art upon review of the following drawings and detailed description. Such additional aspects, including systems, methods, and/or computer program products, are included within the scope of the present invention.

BRIEF DESCRIPTION OF THE SEVERAL VIEWS OF THE DRAWINGS

The accompanying drawing figures incorporated in and forming a part of this specification illustrate several aspects, features, principles and advantages of the present invention, and together with the Detailed Description serve to better explain the aspects, features, principles, and advantages of the invention.

DETAILED DESCRIPTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will convey the invention to those skilled in the art.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another.

For example, a first device could be termed a second device, and, similarly, a second device could be termed a first device without departing from the teachings of the disclosure.

Figure 1:
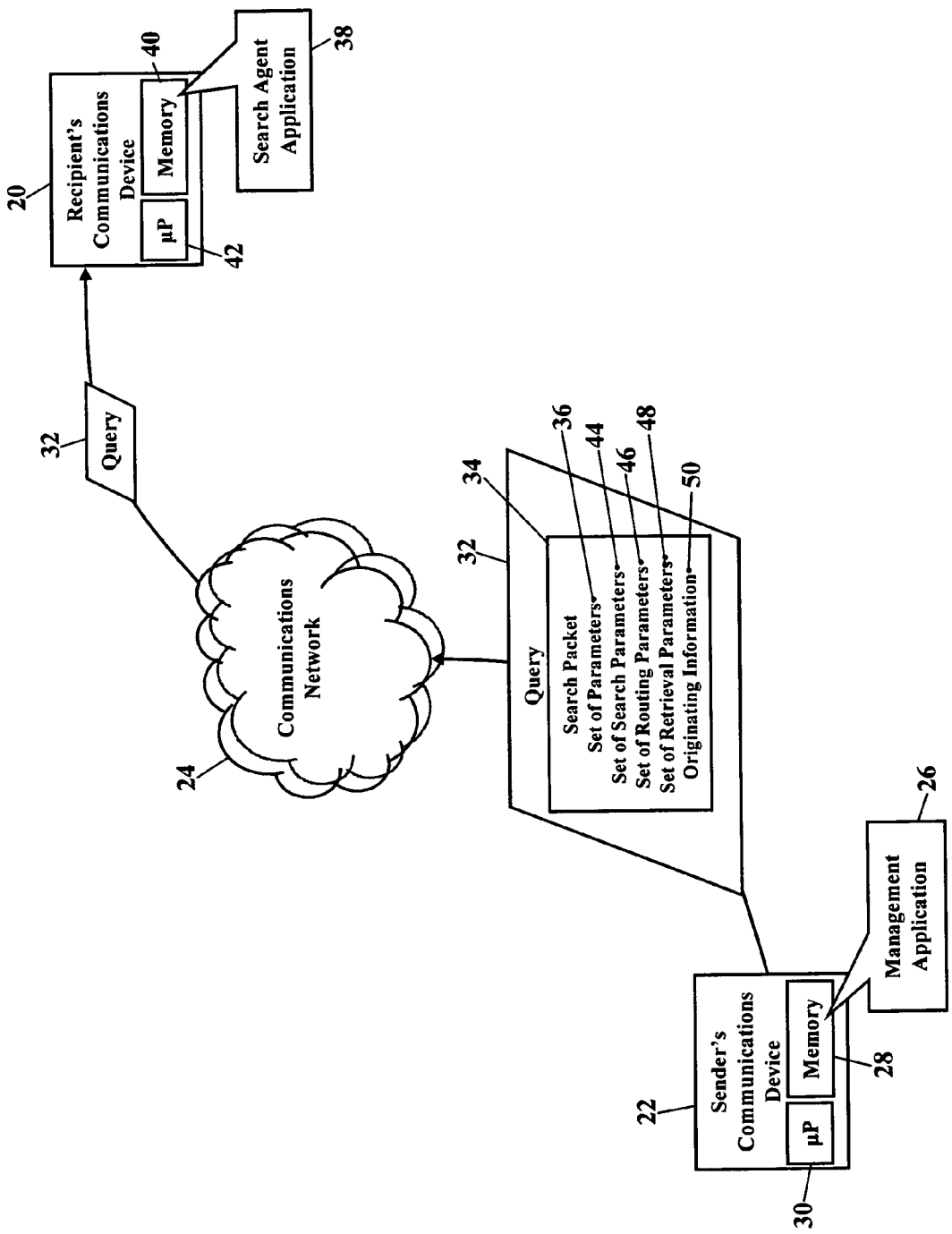
FIG. 1 is a schematic illustrating an environment in which aspects of the present invention may be implemented.

FIG. 1 is a schematic illustrating an environment in which the present invention may be implemented. A recipient's communications device 20 encounters a sender's communications device 22 via a communications network 24. When the devices 20 and 22 encounter each other, the sender's communications device 22 initiates a search for content on the recipient's communications device 20. The sender's communications device 22 stores a management application 26 in memory 28. The management application 26 is a set of processor-executable instructions that are executed by a processor 30 (e.g., "µP"), application specific integrated circuit (ASIC), or other component or device. The management application 26 causes the processor 30 to send a query 32, and the query 32 comprises a search packet 34. The search packet 34 comprises a set 36 of one or more parameters that describe the search, as later paragraphs will explain.

The recipient's communications device 20 receives the query 32. The recipient's communications device 20 stores a search agent application 38 in memory 40. The search agent application 38 is a set of processor-executable instructions that are executed by a recipient processor 42 (e.g., "µP"), application specific integrated circuit (ASIC), or other component or device. The management application 26 and the search agent application 38 cooperate to perform a content search of the recipient's communications device 20. The search agent application 38 performs the content search, according to the set 36 of parameters described by the search packet 34. The search agent application 38 also reports the search results, again according to the set 36 of parameters described by the search packet 34.

The management application 26 manages the search. The management application 26 includes a user interface (such as a graphical user interface) that allows a user to create, monitor, and manage the query 32. The user, for example, may create the search packet 34 and initiate the search. The user may view and/or edit the search packet 34, and the management application 26 monitors the progress of the search packet 34. The management application 26 may receive message or notification updates from the search agent application 38 that describe the recipient's communications device 20 (e.g., manufacturer, model, and an associated owner's or current user's name), the number of positive search results or "hits," and even a routing map that describes the propagation of the query 32 within the communications network 24 and/or between devices (as later paragraphs will explain). When matching content is found at the recipient's communications device 20, the search agent application 38 may send message updates that describe content metadata or headers. The management application 26 thus allows the user to completely manage the search and how search results are reported.

The search packet 34 defines the search. The search packet 34 describes what content is desired by sender's communications device 22, if and/or how the query 32 may be propagated to other devices, and how the search results should be delivered or reported back to the sender's communications device 22. The search packet 34 is communicated from the sender's communications device 22 to the recipient's communications device 20. While the search packet 34 may be communicated during any length of an encounter, the search packet 34 is ideally suited for momentary or transient encounters, where the devices 20 and 22 may briefly encounter each other and establish a short-term communication. If either of the devices 20 and 22 are mobile, for example, their opportunity for communication may be brief. Some of the IEEE 802 family of standards, for example, are more effective at short-range communications when the devices 20 and 22 are proximately located to one another. Some portions of the electromagnetic spectrum (e.g., the Industrial, Scientific, and Medical band for BLUETOOTH® communications) are, likewise, used for short-range and/or low-power communications. So, when the devices 20 and 22 are within the vicinity of each other, they may establish a connection or communications path. If either device 20 or 22 changes location, such that the devices 20 and 22 are no longer in proximity or vicinity, the encounter may cease and communications are ended. The search packet 34, then, provides at least minimum information to accomplish the desired content search. When the devices 20 and 22 are no longer in communication, the recipient's communications device 20 may then continue to perform the search, despite the transient nature of the encounter.

The search packet 34 includes the set 36 of parameters. The set 36 of parameters describes the search requested by the sender's communications device 22. The search packet 34, for example, may comprise one or more of a set 44 of search parameters, a set 46 of routing parameters, and a set 48 of retrieval parameters. The set 44 of search parameters, in simple terms, describes the content for which the search is requested. The set 44 of search parameters may be any data or flags that a user of the management application 26 may select or input. If any data or flag is blank, missing, undecipherable, or erroneous, the management application 26 may utilize default values. The set 36 of parameters thus specifies what content is desired and how the search results are reported. The set of parameters may optionally be transmitted as one or more separate packets. The set 44 of search parameters, for example, may be sent in a first packet or group of packets, while the set 46 of routing parameters and the set 48 of retrieval parameters are later sent in a packet or groups of packets. Some parameters may also be unspecified, and the management application 26 and/or the search agent application 38 may populate unspecified terms with default values.

The search packet 34 may also include originating information 50. The originating information 50 may include any information that describes and/or identifies the sender's communications device 22. The originating information 50, for example, may describe a name or other identifier associated with an owner, or a current user, of the sender's communications device 22. The originating information 50 may additionally or alternatively describe a device ID, a date the query 32 was originated or sent. The originating information 50 may even identify components operating within the sender's communications device 22, such as a processor manufacturer/model, a screen/display size or color capability, or other device components and capabilities.

The search packet 34 may be one or more packets of information. Although the search packet 34 is illustrated as a single packet of information, the search packet 34 may comprise multiple packets of information. The search packet 34 may have any configuration that contains, comprises, or conveys the set 36 of parameters and/or the originating information 50. The search packet 34 may also be packetized according to any packet protocol.

The recipient's communications device 20 and the sender's communications device 22 may be any communications device. The management application 26 and the search agent application 38, for example, may operate within a set-top box, a personal/digital video recorder, personal digital assistant, a Global Positioning System device, a television, an Internet Protocol phone, a pager, a cellular/satellite phone, or any computer system and/or communications device utilizing a digital signal processor. The devices 20 and 22 may also include watches, radios, vehicle electronics, clocks, printers, gateways, and other apparatuses and systems.

The devices 20 and 22, however, are only simply illustrated. Because the architecture and operating principles of communications devices are well known, the hardware and software components of the devices 20 and 22 are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Figure 2:
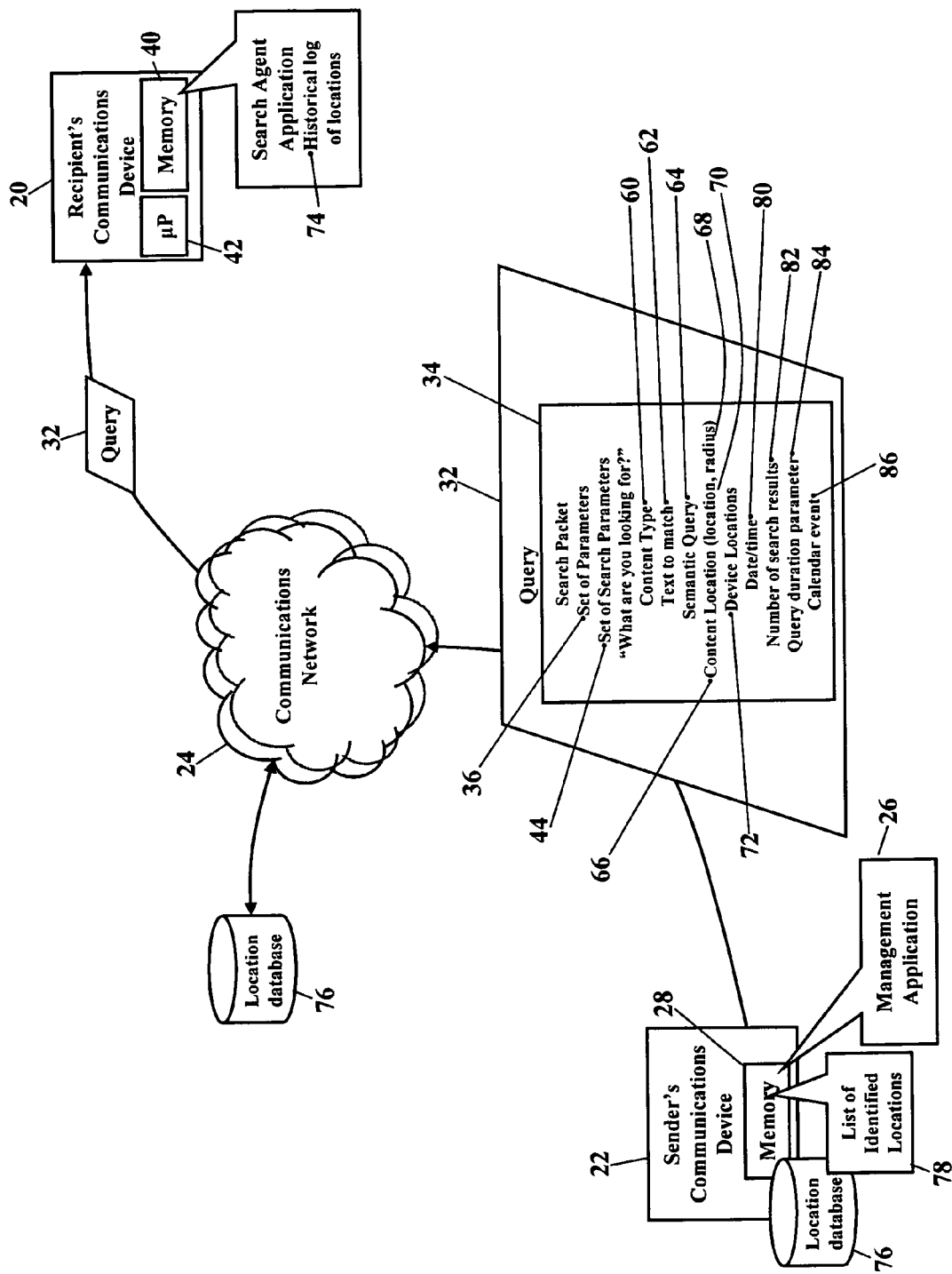
FIGS. 2-4 are schematics illustrating a set of parameters, according to more aspects of the present invention.
Figure 3:
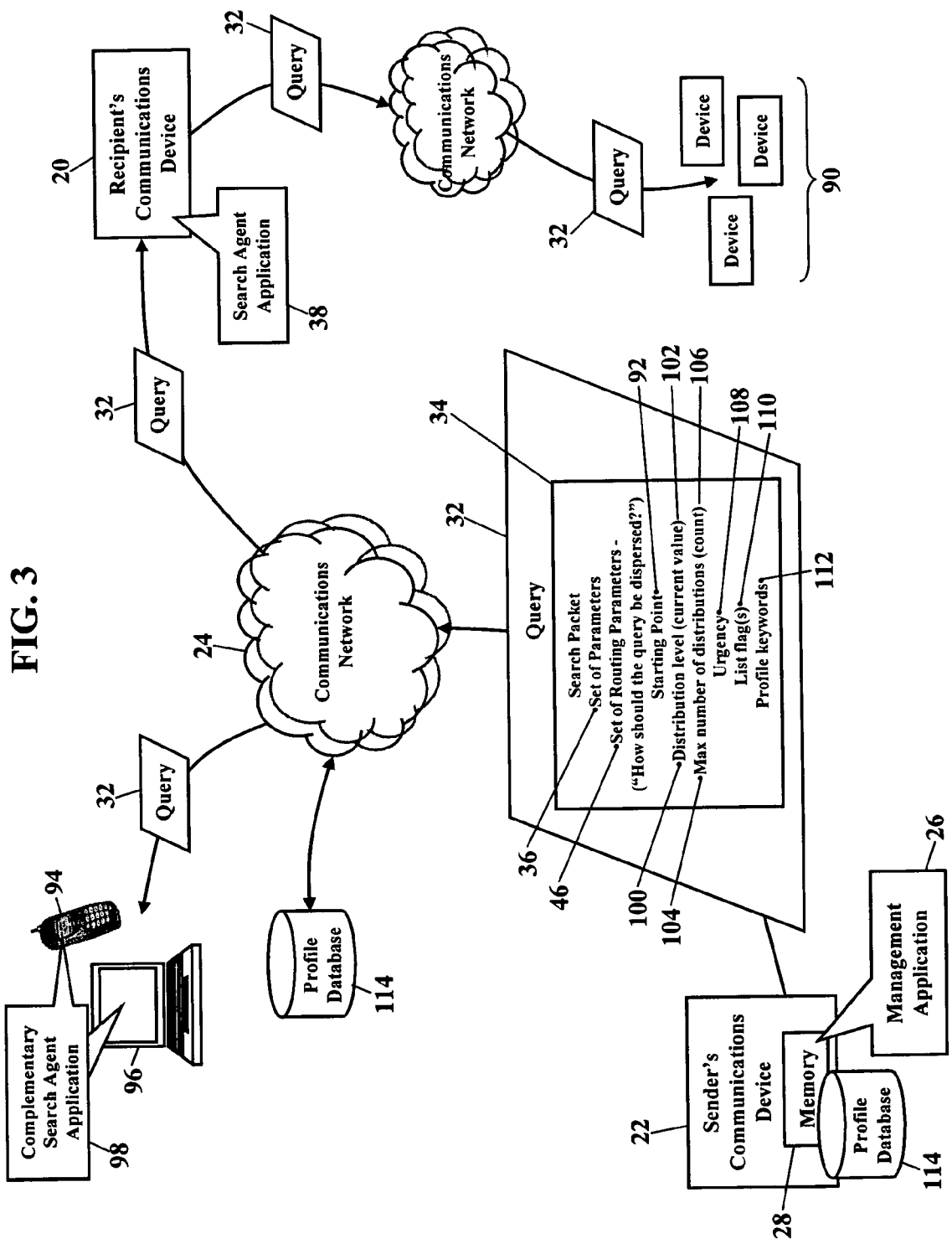
Figure 4:
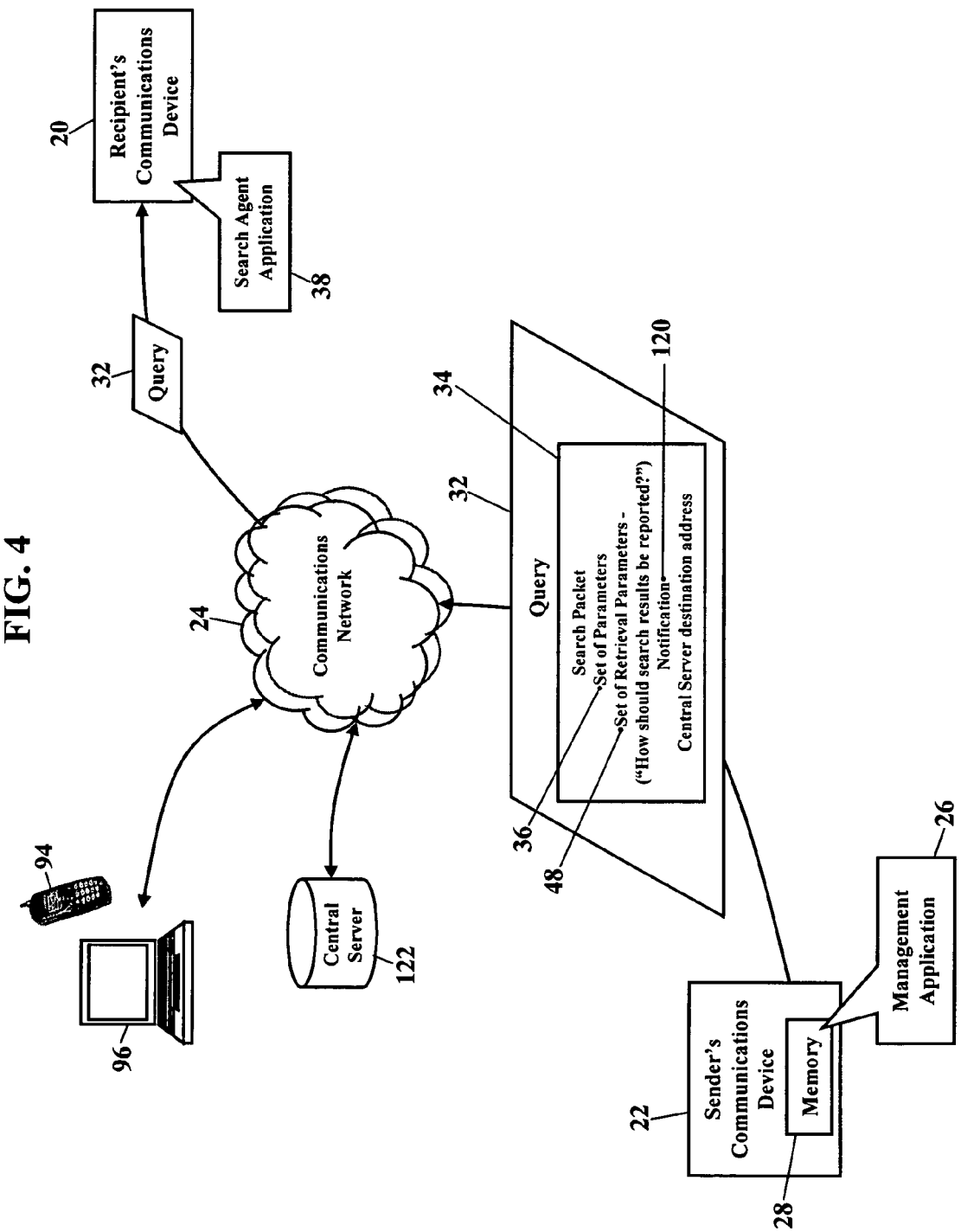

FIGS. 2-4 are schematics further illustrating the set 36 of parameters, according to more aspects of the present invention. FIG. 2, for example, illustrates the set 44 of search parameters. The set 44 of search parameters may describe what content type 60 (such as an image or photo, video, audio, or data file) is desired. The set 44 of search parameters may additionally or alternatively include text to match 62, such as a keyword, multiple keywords, or phrase(s). The set 44 of search parameters may additionally or alternatively include a semantic query 64 to match against semantically-classified content. The set 44 of search parameters may additionally or alternatively define or specify how to retrieve the desired content. Instead of retrieving a 10 MB file, for example, the set 44 of search parameters may specify a small segment of that file to retrieve.

The set 44 of search parameters may specify a content location 66. The set 44 of search parameters, for example, may include information that specifies a location 68 and/or a radius 70. The location 68 may represent a place or location at which the desired content was captured, created, or saved. A digital picture, for example, may be tagged or associated with information describing a location at which the picture was captured or created. The set 44 of search parameters may then specify a search for content that was created within the radius 70 of the location 68. The location 68 and the radius 70 may be expressed as known location names, location coordinates, and/or distances. A user of the management application 26, for example, may wish to query for photos and videos related to a child's school. The user may configure the search packet 34 by specifying the actual name of the child's school (i.e., "Main Street Elementary School"). The user may additionally or alternatively configure the search packet 34 to specify one or more GPS location coordinates that represent the child's school. The user may additionally or alternatively configure the search packet 34 to query for content captured or created within a five (5) mile radius of the child's school. The user may this configure the set 44 of search parameters to specify any location associated with desired content.

The set 44 of search parameters may also specify device locations 72. These are location names or location coordinates associated with the recipient's communications device 20. As the recipient's communications device 20 obtains and stores content, that content may be associated with the current location of the recipient's communications device 20. The user of the management application 26 may configure the search packet 34 to query for content captured, created, or saved at a location associated with the recipient's communications device 20. If, for example, the recipient's communications device 20 is a mobile device, the search agent application 38 may maintain a historical log 74 of locations. This historical log 74 of locations tracks recent and historical locations (e.g., location names and/or GPS coordinates) where the recipient's communications device 20 has previously visited. The search packet 34 may query for content captured, created, or saved at one or more particular locations. Even if the recipient's communications device 20 is a relatively stationary server or desktop computer, the search packet 34 may still query for content captured, created, or saved at the present location. The set 44 of search parameters, then, may specify any location associated with the recipient's communications device 20.

The set 44 of search parameters may include identified locations. Should a user of the management application 26 desire to specify the content location 66 and/or the device location 72, the management application 26 may suggest or provide an identified or named location. For example, instead of selecting cumbersome GPS coordinates, the user may simply select "Main Street Elementary School," "Town Athletic Field," "Apex Barbeque," "SEARS®," or other familiar or actual location name. The management application 26, for example, may access a location database 76. As the management application 26 accumulates GPS locations, the management application 26 may send the historical log 74 of locations to the location database 76. The location database 76 may be locally stored in the sender's communications device 22, or the location database 76 may be remotely stored and accessed via the communications network 24. Wherever the location database 76 is maintained, the location database 76 returns a list 78 of identified locations, wherein an identified location corresponds to a set of GPS coordinates. The user may then select an identified location, instead of GPS coordinates, to specify the content location 66 and/or the device location 72.

The set 44 of search parameters may also specify one or more dates and times 80. The user of the management application 26 may wish to query for content associated with one particular date and/or time or content associated with a range of dates and times. The user may configure the search packet 34 to specify the desired date(s) and time(s). The user, in particular, may specify a date, time, and a location to narrowly define the query. Suppose, for example, that the user volunteers to create a photo memory book for a soccer team. The user wishes to query for any images associated with a particular soccer game. The user may configure the set 44 of search parameters to collect image files saved, created, captured, or tagged with the corresponding game date, game time, and game location. The date and time may even specify the time and date for executing the query 32. The user of the management application 26 may choose a date and/or time for when the search agent application 38 executes the query 32. When the recipient's communications device 20 then receives the query 32, the search agent application 38 may delay execution of the search packet 34 until the appropriate or appointed date and time 80.

The set 44 of search parameters may also specify a number 82 of requested search results. Sometimes the user of the management application 26 wishes to only receive a manageable number of results. Often times, for example, a GOOGLE® search may yield hundreds, or thousands, of search results. Such a large number of search results is often too time consuming to review and, thus, meaningless. The set 44 of search parameters, however, may be configured to limit the search results to a much lower and more manageable number. The user, for example, may wish to only obtain ten (10) search results. When the ten query results are obtained, the search agent application 38 may terminate or suspend the content search and report the search results. The set 44 of search parameters may specify any number of search results from 1 to n, where n is any integer value. After the user reviews the number 82 of requested search results, the user may then edit the set 44 of search parameters to refine the search results.

The set 44 of search parameters may also specify a duration parameter 84. The duration parameter 84 describes how long the query 32 survives, despite a transient encounter between the sender's communications device 22 and the recipient's communications device 20. Even if the sender's communications device 22 and the recipient's communications device 20 only have a momentary or short-term encounter, the duration parameter 84 may cause the recipient's communications device 20 to repeatedly perform the search described by the search packet 34. Each day the recipient's communications device 20 may download/acquire new and/or different content, so the duration parameter 84 causes the search agent application 38 to repeatedly, continuously, or periodically search for the desired content. The duration parameter 84 may be expressed in any terms or units that specify or limit the length of the content search. The duration parameter 84, for example, may be expressed in days, hours, and/or minutes, thus specifying a measure or length of time to repeatedly perform the query search. The duration parameter 84, however, may also be expressed as a maximum count of searches. As each search is completed, a tally of the searches is incremented. When the number of searches equals or exceeds the maximum count of searches, then the search agent application 38 may cease to perform another search. The duration parameter 84 may additionally or alternatively include a minimum count of searches, in which the search agent application 38 should perform a defined or particular number of searches. The search agent application 38 may even have discretion to ignore the duration parameter 84, such as when new content is encountered and/or when no search results have been found. The duration parameter 84 may additionally or alternatively be expressed in terms of processor cycles, in the number of files searched, and/or in the number of folders/subfolders searched. The search packet 34 thus endeavors to find the desired content, knowing that the content stored in the memory 40 of the recipient's communications device 20 may dynamically change.

The set 44 of search parameters may also include a calendar event 86. The calendar event 86 specifies or describes a calendar entry, and the search agent application 38 searches for any content that was created, captured, or stored within the calendar event 86. Many electronic calendaring applications allow users to create calendar entries and to associate the entries with dates and times. Birthdays, holidays, anniversaries, and social activities are often tracked using calendar events. The query 32, then, may specify a search for content related to the calendar event 86. When the search agent application 38 receives the calendar event 86, the search agent application 38 will retrieve any content associated with that calendar event 86. If the calendar event 86 corresponds to a future date/time, the search agent application 38 may even automatically tag, sort, and communicate content associated with the calendar event 86.

FIG. 3 illustrates the set 46 of routing parameters. The set 46 of routing parameters determines whether the recipient's communications device 20 is permitted to forward, or disperse, the query 32 to other devices 90. The search agent application 38, then, may itself query these other devices 90 to help obtain the desired search results. If the recipient's communications device 20 is permitted to disperse the query 32 to the other devices 90, the set 46 of routing parameters may also describe or instruct how the query 32 may be propagated.

As FIG. 3 illustrates, the set 46 of routing parameters may include a starting point 92. The starting point 92 specifies a beginning device to which the query 32 is first addressed. The query 32 may originate from the sender's communications device 22 and route to the recipient's communications device 20. The user of the management application 26, however, may specify a different device to which the query 32 communicates. Suppose that the user of the management application 26 maintains several communications devices. FIG. 3, for example, illustrates a mobile phone 94 and a mobile laptop computer 96. Both the mobile phone 94 and the mobile laptop computer 96 may execute a complementary search agent application 98. The user of the management application 26 may specify that the query 32 first communicate to the mobile phone 94 and/or to the mobile laptop computer 96 and then forward to the recipient's communications device 20. The user may even specify that the query 32 first communicate to the mobile phone 94 and/or the mobile laptop computer 96 and then disperse or "fan out" to the recipient's communications device 20. The user may thus specify how the query 32 first disperses, and/or where the query 32 first executes, as specified by the set 46 of routing parameters.

The set 46 of routing parameters may include a distribution level 100. The distribution level 100 describes how many levels within the recipient's social network that the query 32 may propagate. After the query 32 executes on the recipient's communications device 20, the search agent application 38 may distribute the query 32 to the other devices 90. The set 46 of routing parameters may specify that the query 32 only distribute to other devices associated with the recipient. The set 46 of routing parameters may alternatively specify that the query 32 only distribute to another user's device(s). The user of the management application 26 may alternatively specify that the query 32 distribute to other devices associated with the recipient and to another user's device(s). The set 46 of routing parameters may even specify that the query 32 only disperse to known devices (such as "friends of friends"). While the distribution level 100 may have any scheme, here the distribution level 100 only decrements, or changes, when the query 32 propagates to a different user's device. That is, whatever a current value 102 of the distribution level 100, that current value 102 may only change, or decrement, when the query 32 is distributed to a different user's device. If the query 32 distributes to another device associated with the recipient, then the current value 102 of the distribution level 100 is maintained. The management application 26 and the search agent application 38 may thus utilize users, as opposed to devices, to determine the number of levels to search. The distribution level 100 may only change when the query 32 is distributed to a different user's device.

The set 46 of routing parameters may include a maximum number 104 of distributions for the query 32. As the query 32 distributes or propagates to the recipient's communications device 20, the user of the management application 26 may specify how the recipient's communications device 20 further distributes the query 32. The user may establish the maximum number 104 of distributions for the query 32, thus limiting how many times the query 32 may be distributed to other devices. The user may limit the maximum number 104 of distributions to known devices, to unknown devices, or even total distributions. The search agent application 38 maintains, tracks, or tallies a count 106 of query distributions. If the count 106 of query distributions is less than the maximum number 104 of distributions, then the search agent application 38 may distribute the query 32. As the query 32 is distributed, the search agent application 38 increments the count 106 of query distributions. When the count 106 of query distributions is equal to or greater than the maximum number 104 of distributions, then the search agent application 38 may no longer have authority to distribute the query 32.

The set 46 of routing parameters may also specify an urgency 108 for the query 32. If the user of the management application 26 urgently requires search results, the user may specify a priority to the query 32. When the recipient's communications device 20 then receives the query 32, the search agent application 38 may then prioritize and queue the query 32 according to the urgency 108. A "high" urgency, for example, may be queued for immediate execution, while a "normal" urgency may be queued in the order of receipt. The execution of "low" urgency queries may be deferred until all "high" urgency queries and all "normal" urgency queries have been completed. The urgency 108 may also be used to prioritize any distributions to the other devices 90.

The set 46 of routing parameters may also include one or more list flags 110. When a list flag is set, the search agent application 38 may only distribute the query 32 to members of that list. The user of the management application 26 may thus confine or limit content searches to only known devices. If a device address, or associated user name, is not a member of the flagged list, then the search agent application 38 may be prohibited from querying that unlisted device or user. The list flags 110 may identify or mark an Instant Messaging list, a contact list, a list of known devices, device types, user types, and/or a list of known users. The user may even maintain a list of trusted content sources, thus prohibiting a search of unknown servers and other devices. When a device is encountered, the management application 26 and/or the search agent application 38 may obtain an I.P. address, microprocessor number, or other name or number that identifies the device. The identifying name or number is then mapped to any of the flagged lists.

The set 46 of routing parameters may also include profile keywords 112. As the management application 26 and/or the search agent application 38 distribute the query 32, the query 32 may only be distributed to devices or users matching the profile keyword(s) 112. The management application 26 and/or the search agent application 38 may store or access a profile database 114. The profile database 114 may be queried for data or entries matching the profile keywords 112. The profile database 114 may be locally stored in the sender's communications device 22, or the profile database 114 may be remotely stored and accessed via the communications network 24. Wherever the profile database 114 is maintained, the management application 26 and/or the search agent application 38 may then send or distribute the query 32 to only those devices or users that match the profile keyword(s) 112.

FIG. 4 illustrates the set 48 of content retrieval parameters. The set 48 of content retrieval parameters determines what the search agent application 38 should do when content is found that matches the query 32. The search agent application 38, for example, may send a notification 120. The notification 120 may communicate from the recipient's communications device 20 and to the sender's communications device 22 via the communications network 24. The notification 120 may describe a positive or negative search result. The notification 120 may include information that describes what content was found (e.g., title, content type) and from whom (e.g., device identifier, user name). The notification 120 may be any form of communication to any communications address. The user of the management application 26, for example, may select to receive an email message for each positive search result. The user may, instead, wish to receive a batch notification describing the positive search results. This batch notification could be a single communication describing all the positive search results from a single user's device. If the user does not want to be "peppered" with notifications, the user may select to receive a single batch notification that describes all the search results from all the queried devices. The user may additionally or alternatively select to receive an instant message describing all the positive search results from a single device. The user, instead, may decline all notifications. The notification 120 may additionally or alternatively communicate to the querying user's mobile phone 94 and/or mobile laptop computer 96. The notification 120 may, in general, be sent to any communications address to inform any party of the search results. The Any and all of the notifications 120 may be batch sent to the user/originator, The set 48 of content retrieval parameters may also specify how content is retrieved. Because the management application 26 and the search agent application 38 may only have a brief encounter, the search agent application 38 may not be able to communicate, or download, the search results directly to the management application 26. If either the sender's communications device 22 or the recipient's communications device 20 is mobile, days or even weeks may pass before the devices 20 and 22 have another encounter. It is even possible that the devices 20 and 22 never again encounter each other. The user of the management application 26, then, may specify how matching content is delivered. Even though the encounter may be brief, the query 32 may survive and the search agent application 38 may continue to perform the desired content search. The user of the management application 26, then, may select to have the query results reported or communicated to a central server 122. When the search agent application 38 finds content matching the query 32, the search agent application 38 instructs the recipient processor 42 to send that matching content to the central server 122. The user of the management application 26 may then access the central server 122 and manually or automatically retrieve the matching content. The set 48 of content retrieval parameters, however, may specify that the matching content be communicated as an email attachment and/or text message.

Figure 5:
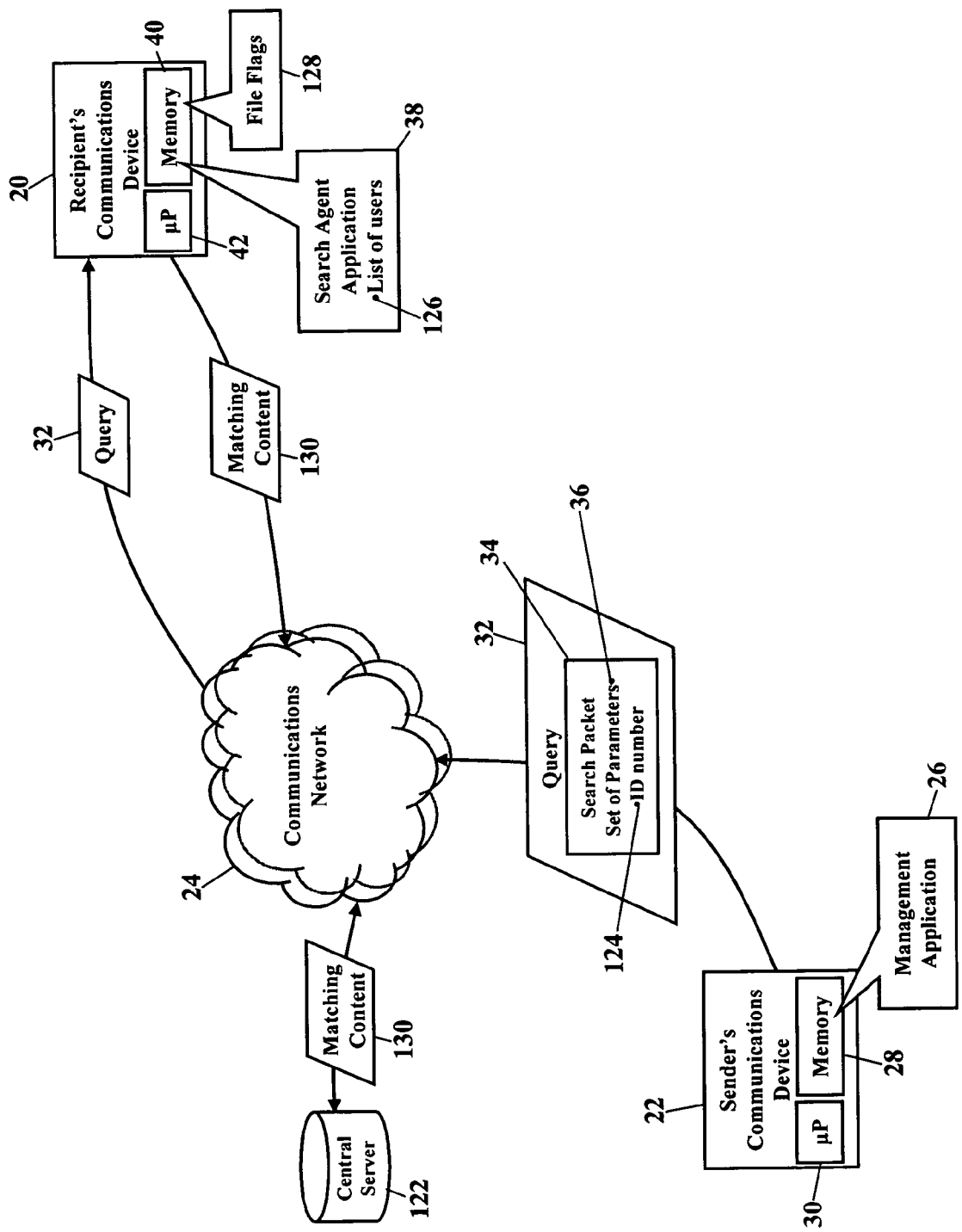
FIG. 5 is a schematic illustrating receipt of a query, according to still more aspects of the present invention.

FIG. 5 is a schematic illustrating receipt of the query 32, according to still more aspects of the present invention. When the recipient's communications device 20 encounters the sender's communications device 22, the sender's communications device 22 initiates a search for content on the recipient's communications device 20. The sender's communications device 22 sends the query 32 comprising the search packet 34. The search packet 34 includes the set 36 of parameters that describe the search requested by the sender's communications device 22. While the search packet 34 may have any configuration and/or format, the search packet 34 may be an eXtensible Markup Language (XML) document. Because the management application 26 and the search agent application 38 may only have a brief encounter, the search packet 34 may be delivered via a BLUETOOTH® connection (or other communication suitable for close proximity). The management application 26 may assign a unique identification number 124 to the search packet 34, thus helping prevent the search agent application 38 from duplicately executing the same query.

When the recipient's communications device 20 receives the query 32, the search agent application 38 may first determine whether the query 32 is acceptable. A user of search agent application, for example, may establish a list 126 of users. The list 126 of users may include or list user names from whom queries are acceptable. The list 126 of users may additionally or alternatively list devices (e.g., device identifiers) from whom queries are acceptable. The list 126 of users may even include names and/or devices from whom queries are not accepted. If a querying user or device is not found in the list 126 of approved users, the search agent application 38 may have authority to decline receipt or execution of the query 32. The search agent application 38 may alternatively prompt to receive or to execute a query from an unknown user or device.

If the query 32 is acceptable, the search agent application 38 may queue the query 32 for execution (perhaps according to the urgency 108, as earlier explained). As the search agent application 38 executes the query 32, the search agent application 38 may at any time check one or more file flags 128. These file flags determine whether or not a file, folder, or other memory location is accessible to the search agent application 38. If a file or folder is not accessible, then the search agent application 38 may bypass, skip, or ignore that file or folder. The file flags 128 thus permit a user to maintain the privacy of files and folders, thus denying access to their content.

The search agent application 38 performs the content search. The search agent application 38 queries and/or searches the memory 40 for any content matching the search packet 34 and/or the set 36 of parameters. If any matching content 130 is found, one or more of the notifications 120 may be sent. The matching content 130 may be downloaded to the central server 122. The search agent application 38 may repeatedly search for content until the duration parameter 84 is satisfied, until the number 82 of requested search results is obtained, or until any of the remaining set 36 of parameters is satisfied or exhausted.

Figure 6:
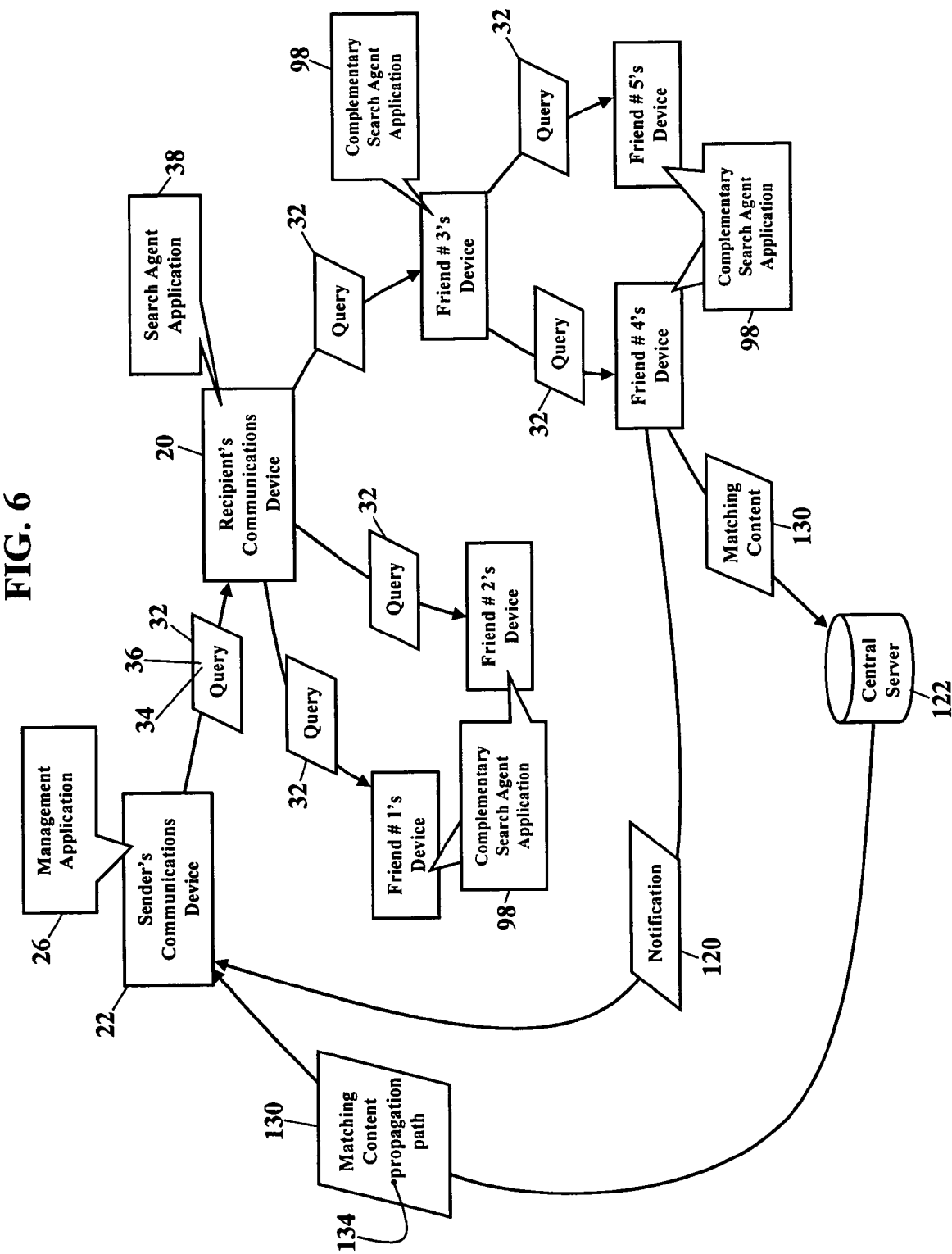
FIG. 6 is a schematic illustrating distributed queries, according to even more aspects of the present invention.

FIG. 6 is a schematic illustrating distributed queries, according to even more aspects of the present invention. Here the search agent application 38 may distribute the query 32 to other devices, according to the set 36 of parameters in the search packet 34. The search agent application 38 may distribute the query 32 before, during, or after conducting a search of the recipient's communications device 26. As FIG. 6 illustrates, the recipient's communications device 20 may communicate with any number of devices via any communications path or network. These devices may be known (e.g., "friends" as described by the one or more list flags 110) or unknown. The complementary search agent application 98 operates in each device and performs a content search according to the search packet 34 contained within the query 32. As the recipient's communications device 20 encounters each device, the search agent application 38 may, or may not, distribute the query 32 to each device. The search agent application 38 may distribute the query 32 until the duration parameter 84 is satisfied, until the number 82 of requested search results is attained, until the maximum number 104 of distributions is attained, until the distribution level 100 is attained, and/or until any of the remaining set 36 of parameters is satisfied or exhausted. The search agent application 38 thus propagates the query 32 to enhance the chances of finding matching content.

The query 32 may continue to propagate amongst the recipient's social network of friends. The set 36 of parameters within the search packet 34 determines if, and how, the query 32 "fans out" to other devices. After the query 32 executes on any device, the query 32 may be propagated to other devices of that same user. The query 32 may additionally or alternatively propagate to "friends of that friend," and so on, until the number 82 of requested search results is attained, until the maximum number 104 of distributions is attained, until the distribution level 100 is attained, and/or until any of the remaining set 36 of parameters is satisfied or exhausted.

When the search results are reported, the search results may include a propagation path 134. The search agent application 38, or the complementary search agent application 98, performs the content search and reports the matching content 130. When the matching content 130 is found, the notification 120 may be sent to the management application 26. The search agent application 38, or the complementary search agent application 98, may additionally or alternatively download or communicate the matching content 130 to the central server 122. Although not shown, if the encounter endures, either search agent application 38 or 98 may communicate the matching content 130 directly to the management application 26. However the results are reported, the matching content 130 may include information describing the propagation path 134 for the query 32 and information describing each user or device along the propagation path 130. As the query 32 propagates through the recipient's social network, the search packet 34 may log the propagation path 134. When the search results (e.g., the matching content 130) are then reported, the central server 122 may report or include the propagation path 134 for those search results. The propagation path 134 may additionally or alternatively be reported with the notification 120 or in a separate message (e.g., email, instant message, page, or any other communication). The originating user of the management application 26, then, will know from whom the content was obtained.

Figure 7:
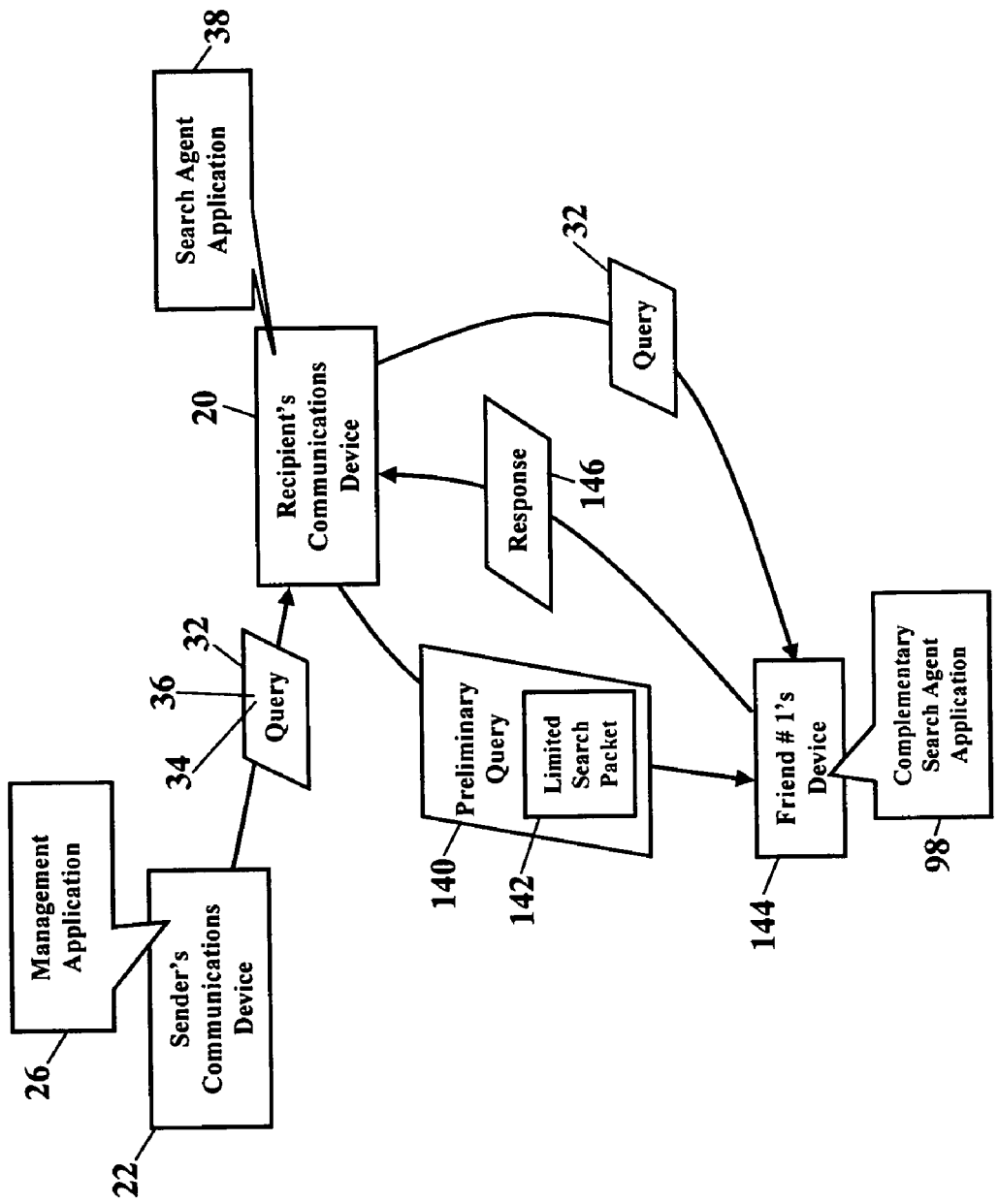
FIG. 7 is a schematic illustrating preliminary queries, according to more aspects of the present invention.

FIG. 7 is a schematic illustrating preliminary queries, according to more aspects of the present invention. Here, instead of first sending the entire search packet 34, the search agent application 38 may send a reduced content, or scaled-back, preliminary query 140. The preliminary query 140 comprises a limited search packet 142 to determine if a receiving device 144 (e.g., the "Friend #1's device) will accept queries. The receiving device 144, for example, may not recognize the recipient's communications device 20, or the receiving device 144 may not be permitted to accept content queries. The search agent application 38, then, may first send the preliminary query 140. The search agent application 38 then receives a query response 146. If the query response 146 is acceptable to the search agent application 38, then the search agent application 38 may distribute the query 32 with the entire search packet 34. Here, then, the search agent application 38 may save time and bandwidth by sending the preliminary query 140 (with the limited search packet 142). The query response 146 then determines whether time, bandwidth, or other constraint warrants sending the entire search packet 34.

Figure 8:
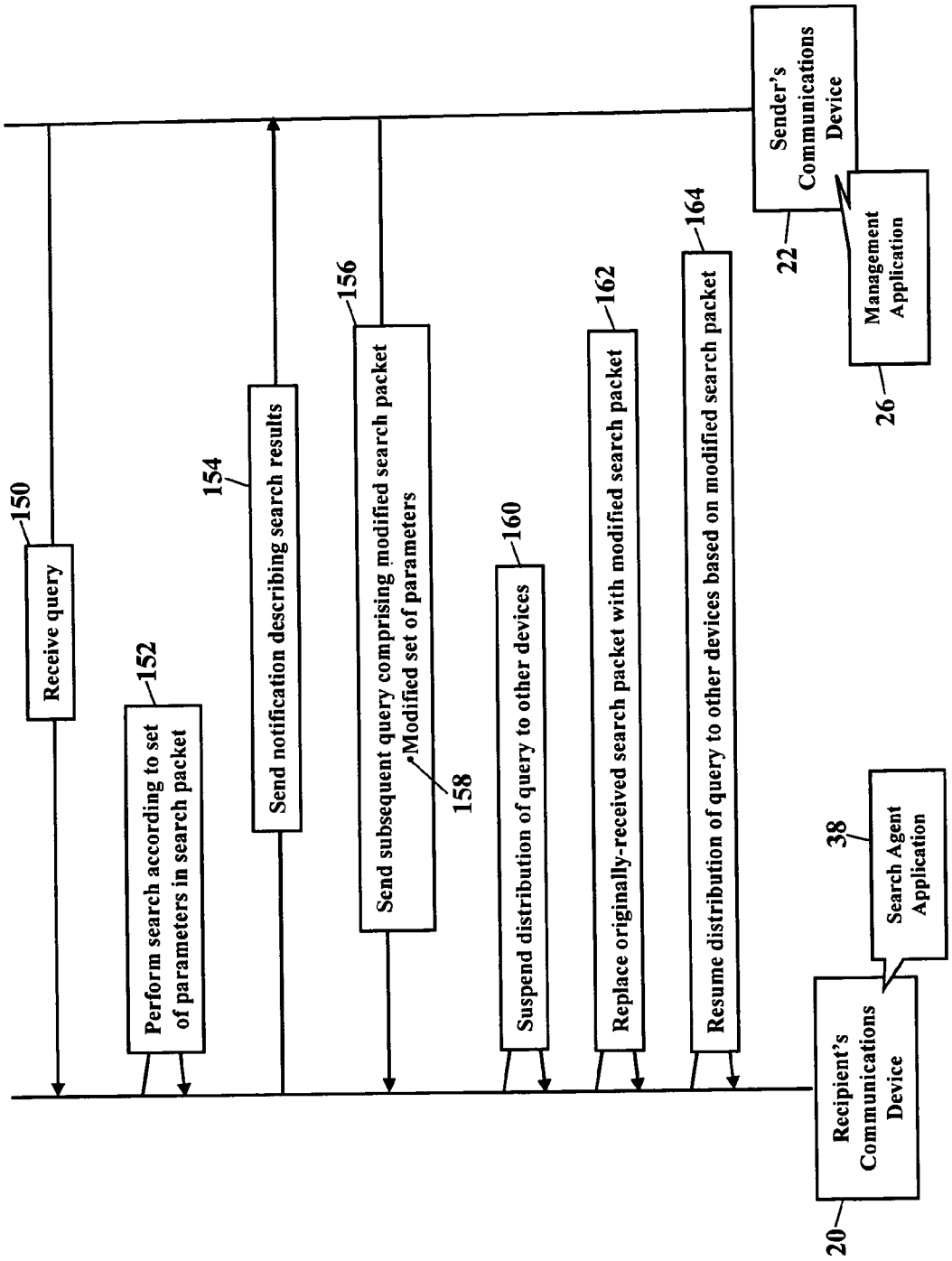
FIG. 8 is a schematic illustrating a process for modified queries, according to additional aspects of the present invention.

FIG. 8 is a schematic illustrating a process for modified queries, according to additional aspects of the present invention. Here the management application 26 and/or the search agent application 38 may modify a content search. For example, when the search agent application 38 receives the search query (Step 150), the search agent application 38 performs a search for content, according to the set of parameters in the search packet (Step 152). The search agent application 38 may send one or more notifications reporting the search results (Step 154). Sometimes, however, the search results may be too numerous to be meaningful. Because the encounter may be transient, the management application 26 may not want to waste precious communications time on an overly-broad search packet. The user of the management application 26 (or the user of the search agent application 38) may wish suspend or halt an in-progress search (performed according to the previously communicated search packet) and, instead, send a subsequent query comprising a refined or modified search packet (Step 156). The modified search packet may contain a modified set 158 of parameters. The management application 26 may even autonomously send the modified search packet whenever predefined conditions are met. Regardless, when the search agent application 38 receives the modified search packet, the search agent application 38 may suspend distribution of the query to other devices (Step 160). The search agent application 38 may replace the originally-received search packet with the modified search packet (Step 162). When the search agent application 38 then resumes distribution of the query to other devices, the query includes the modified search packet (Step 164). The present invention thus permits editing the existing search packets to "tweak" the search results.

Figure 9:
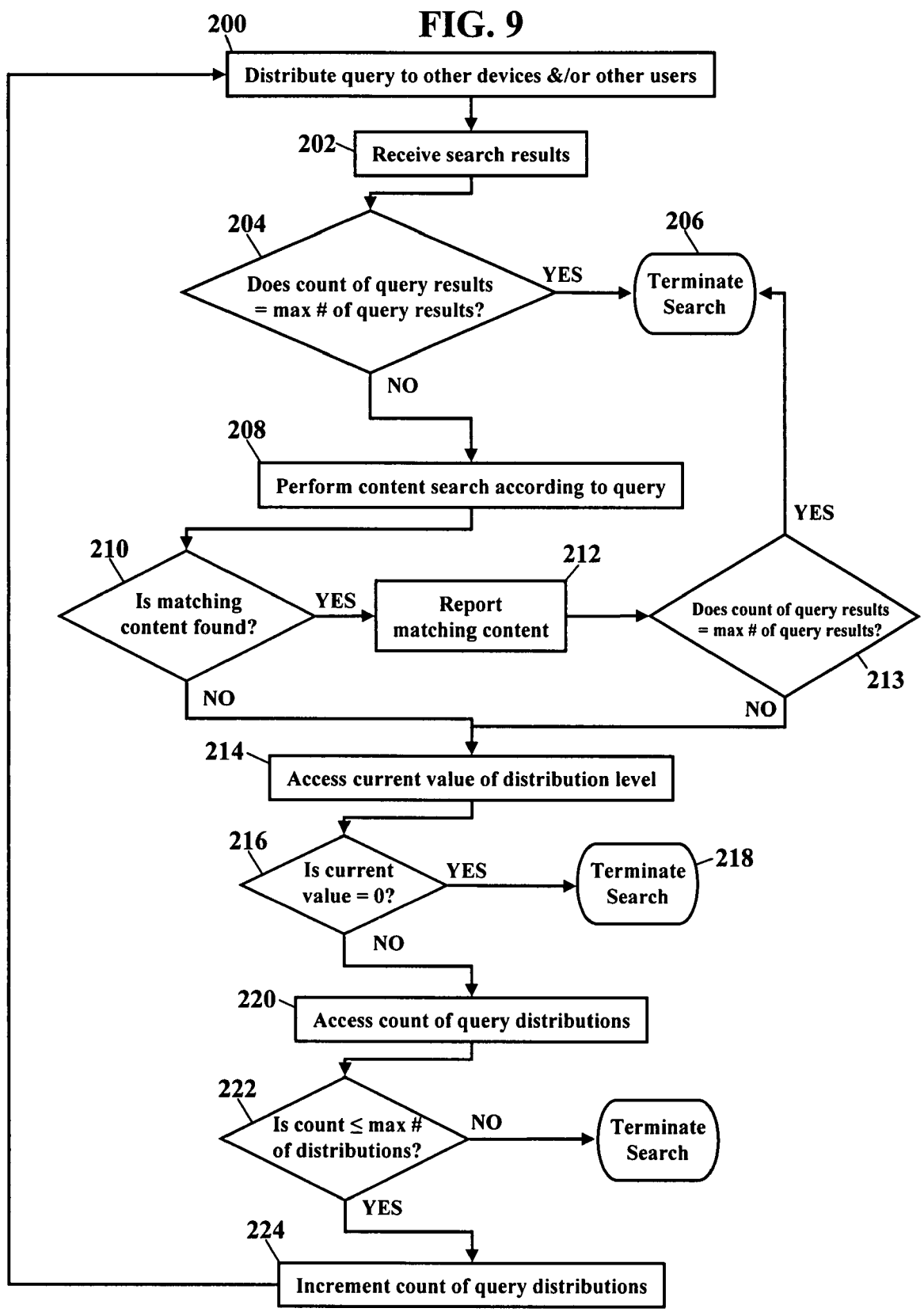
FIG. 9 is a flowchart illustrating a method of search social networks, according to aspects of the present invention.

FIG. 9 is a flowchart illustrating a method of searching social networks, according to aspects of the present invention. The query 32 is distributed to other devices and/or other users (such as a known "friends" list) (Block 200) and search results are received (Block 202). If a count of query results is equal to a maximum number of query results (Block 204), then the search is terminated (Block 206). If the count of query results is less than the maximum number of query results (Block 204), then a content search is performed according to the query (Block 208). If matching content is found (Block 210), the matching content is reported according to the set of parameters in the search packet (Block 212). The count of query results is again checked (Block 213). If matching content is not found (Block 210), then a current value of the distribution level is accessed (Block 214). The distribution level describes the number of levels to distribute the query within a social network. If the current value of the distribution level is zero (Block 216), then the search is terminated (Block 218). If the current value of the distribution level is non-zero (Block 216), then a count of query distributions is accessed (Block 220). If the count of query distributions is less (or equal to) than a maximum number of distributions (Block 222), then the count of query distributions is incremented (Block 224) and the query is distributed to another user and/or another device (Block 200).

The management application 26 and/or the search agent application 38 may be physically embodied on a computer-readable media. This media may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable media could be distributed to end-users, licensees, and assignees. These types of computer-readable media, and other types not mention here but considered within the scope of the present invention, allow the management application 26 and/or the search agent application 38 to be easily disseminated. A computer program product comprises the management application 26 and/or the search agent application 38 stored on the computer-readable media. The management application 26 and/or the search agent application 38 comprise computer-readable instructions/code for searching social networks, as hereinabove explained.

While the present invention has been described with respect to various aspects, features, principles, and exemplary embodiments, those skilled and unskilled in the art will recognize the present invention is not so limited. Other aspects, variations, modifications, and alternative embodiments may be made without departing from the spirit and scope of the present invention and are considered within the scope of the concepts disclosed herein and the invention as described by the claims.

What is claimed is:

1. A processor-implemented method of operation of a first device, comprising:
    encountering a second device;
    establishing a communication session with the second device;
    receiving, at the first device, a query from the second device comprising a search packet;
    receiving a maximum number of distributions for the query;
    searching, at the first device, for content according to a query parameter described by the search packet;
    ending the established communication session;
    incrementing a count of query distributions;
    if the count of query distributions is less than the maximum number of distributions, then incrementing the count of query distributions;
    distributing the query to a third device: and
    repeatedly performing, at the first device, the search according to a duration parameter described by the search packet after the established communication session has ended.

2. A method according to claim 1, further comprising the step of reporting a query result to a central server.

3. A method according to claim 1, further comprising the step of terminating the search when the duration parameter expires.

4. A method according to claim 1, further comprising incrementing a count of query results until a maximum number of query results is obtained.

5. A method according to claim 1, further comprising the step of terminating the search when a maximum number of query results is obtained.

6. A method according to claim 1, further comprising
    i) distributing a preliminary query to a fourth device, the preliminary query comprising a limited search packet;
    ii) receiving a response to the preliminary query; and
    iii) if the response is acceptable, then distributing the query to the fourth device, the query comprising the search packet.

7. A method according to claim 1, further comprising the steps of:
    i) encountering a device having a device identifier;
    ii) mapping the device identifier to a list of known users; and
    iii) if the device identifier is associated with a known user, then distributing the query to the device having the device identifier.

8. A method according to claim 1, further comprising the steps of:
    i) receiving a distribution level describing a number of levels to distribute the query within a social network;
    ii) distributing the query to another device of a same user and maintaining a current value of the distribution level; and
    ii) distributing the query to a different user's device and decrementing the distribution level.

9. A method according to claim 1, further comprising receiving a calendar event and searching for content that was created within the calendar event.

10. A method according to claim 1, further comprising the steps of:
    i) receiving a modified query comprising a modified search packet;
    ii) suspending searching for content based on the search packet; and
    iii) resuming searching for content based on the modified search packet.

11. A method according to claim 1, further comprising the steps of:
    i) receiving a location and a radius; and ii) searching for content that was created within the radius of the location.

12. A method according to claim 1, further comprising the step of sending a notification when a query result is positive.

13. A method according to claim 1, further comprising the steps of:
  i) sending a historical list of GPS coordinates;
  ii) retrieving a list of identified locations, wherein an identified location corresponds to a set of GPS coordinates; and
  iii) including the identified location in the search packet.

14. A method according to claim 1, further comprising the step of sending a query result to an address associated with the second device initiating the query, the query result comprising information describing a propagation path for the query and information describing each user along the propagation path.

15. A method according to claim 1, further comprising the step of delaying searching for the content until an execution time is specified in the search packet.

16. A method according to claim 1, further comprising the step of checking a flag to determine if a file is accessible when searching for the content.

17. A method according to claim 1, further comprising the step of querying a list of approved users to determine if a user may query for content.

18. A system, comprising:
  an agent application stored in memory; and
  a processor communicating with the memory and executing the agent application,
  the system encountering a device, establishing a communication session with the device, receiving a query comprising a search packet from the device, receiving a maximum number of distributions for the query, the system searching for content according to a query parameter described by the search packet, the system ending the established communication session, incrementing a count of query distributions, if the count of query distributions is less than the maximum number of distributions, then incrementing the count of query distributions, distributing the query to a third device, and the system repeatedly performing the search according to a duration parameter described by the search packet after the established communication session has ended.

19. A computer program product storing processor-executable instructions for operating a first device, the instructions for:
  encountering a second device;
  establishing a communication session with the second device;
  receiving, at the first device, a query from the second device comprising a search packet;
  receiving a maximum number of distributions for the query;
  searching, at the first device, for content according to a query parameter described by the search packet;
  ending the established communication session;
  incrementing a count of query distributions;
  if the count of query distributions is less than the maximum number of distributions, then incrementing the count of query distributions;
  distributing the query to a third device; and
  repeatedly performing, at the first device, the search according to a duration parameter described by the search packet after the established communication session has ended.

20. A device, comprising:
  an agent application stored in memory; and
  a processor communicating with the memory and executing the agent application,
  the device adapted to:
    encounter a second device;
    establish a communication session with the second device;
    receive a query comprising a search packet from the second device;
    search for content according to a query parameter described by the search packet;
    end the established communication session with the second device;
    repeatedly perform the search according to a duration parameter described by the search packet after the established communication session with the second device has ended;
    receive a distribution level describing a number of levels to distribute the query within a social network;
    distribute the query to another device of a same user and maintain a current value of the distribution level;
    distribute the query to a different user's device and decrement the distribution level; and
    send results from the search to a central server for retrieval.

21. A processor-implemented method of operation of a first device, comprising:
  encountering a second device;
  establishing a communication session with the second device;
  receiving, at the first device, a query from the second device comprising a search packet;
  searching, at the first device, for content according to a query parameter described by the search packet;
  ending the established communication session;
  repeatedly performing, at the first device, the search according to a duration parameter described by the search packet after the established communication session has ended;
  distributing a preliminary query to a third device, the preliminary query comprising a limited search packet;
  receiving a response to the preliminary query; and
  if the response is acceptable, then distributing the query to the third device, the query comprising the search packet.

* * * * *